(12) United States Patent  
Shifman

(10) Patent No.: US 7,228,877 B2  
(45) Date of Patent: Jun. 12, 2007

(54) FLEXIBLE HOSE HAVING REDUCED FUEL VAPOR PERMEABILITY AND METHOD OF MANUFACTURING SUCH HOSE

(75) Inventor: Jerry Shifman, Wildersville, TN (US)

(73) Assignee: Dayco Products, LLC, Miamisburg, OH (US)

( * ) Notice: Subject to any disclaimer, the term of this patent is extended or adjusted under 35 U.S.C. 154(b) by 604 days.

(21) Appl. No.: 10/823,893

(22) Filed: Apr. 13, 2004

(65) Prior Publication Data

US 2004/0187948 A1  Sep. 30, 2004

Related U.S. Application Data

(60) Continuation-in-part of application No. 10/071,634, filed on Feb. 7, 2002, now abandoned, which is a division of application No. 09/754,674, filed on Jan. 4, 2001, now Pat. No. 6,365,250, which is a division of application No. 09/083,294, filed on May 22, 1998, now Pat. No. 6,203,873.

(51) Int. Cl.  
*F16L 11/00* (2006.01)

(52) U.S. Cl. .................. 138/126; 138/137; 138/141; 428/36.7; 428/36.8; 428/36.91; 428/421; 428/422

(58) Field of Classification Search .......... 428/36.7, 428/36.8, 36.91, 421, 422, 36.3, 212; 525/199; 138/137, 141, 126  
See application file for complete search history.

(56) References Cited

U.S. PATENT DOCUMENTS

| | | |
|---|---|---|
| 3,864,228 A | 2/1975 | Rossetti |
| 4,130,535 A | 12/1978 | Coran et al. |
| 4,330,017 A | 5/1982 | Satoh et al. |
| RE32,230 E | 8/1986 | Satoh et al. |
| 4,606,952 A | 8/1986 | Sugimoto |
| 4,758,455 A | 7/1988 | Campbell et al. |
| 4,828,923 A | 5/1989 | Nakagawa et al. |
| 4,881,576 A * | 11/1989 | Kitami et al. ............... 138/125 |
| 4,988,548 A | 1/1991 | Takemura et al. |
| 5,006,594 A | 4/1991 | Rees |
| 5,051,480 A | 9/1991 | Coran |
| 5,053,450 A | 10/1991 | Coran |
| 5,057,345 A | 10/1991 | Barrett |
| 5,061,965 A | 10/1991 | Ferguson et al. |
| 5,084,314 A * | 1/1992 | Igarashi et al. ............ 428/36.2 |
| 5,109,071 A | 4/1992 | Johnson et al. |
| 5,194,508 A | 3/1993 | Nicholas |
| 5,206,293 A | 4/1993 | Sakai et al. |
| 5,320,888 A | 6/1994 | Stevens |
| 5,367,023 A | 11/1994 | Caporiccio et al. |
| 5,371,143 A | 12/1994 | Novak et al. |
| 5,405,912 A | 4/1995 | Simkin |

(Continued)

FOREIGN PATENT DOCUMENTS

EP  432911-A-1  6/1991

OTHER PUBLICATIONS

DYNEON, Fluorothermoplastics Product Information, two pages, Dec. 2000.

*Primary Examiner*—James Hook  
(74) *Attorney, Agent, or Firm*—Joseph V. Tassone; J. Daniel Lykins

(57) ABSTRACT

A flexible fuel hose having improved fuel vapor barrier properties wherein the fuel hose comprises a first fluoropolymer layer forming a first barrier tubular structure and a second fluoropolymer layer forming a second tubular structure around the first barrier tubular structure; and a method for the manufacture of such hose are described.

27 Claims, 2 Drawing Sheets

U.S. PATENT DOCUMENTS

| | | |
|---|---|---|
| 5,430,603 A | 7/1995 | Albino et al. |
| 5,588,469 A * | 12/1996 | Kakiuchi et al. ............ 138/137 |
| 5,639,528 A | 6/1997 | Feit et al. |
| 5,679,425 A * | 10/1997 | Plumley .................... 428/35.7 |
| 5,718,957 A | 2/1998 | Yokoe et al. |
| 5,908,704 A | 6/1999 | Friedman et al. |
| 5,941,286 A | 8/1999 | Fauble et al. |
| 5,957,164 A * | 9/1999 | Campbell ................... 138/137 |
| 6,037,025 A * | 3/2000 | Matsunaga et al. ...... 428/36.91 |
| 6,048,940 A | 4/2000 | Bladel et al. |
| 6,077,609 A | 6/2000 | Blong et al. |
| 6,117,508 A | 9/2000 | Parsonage et al. |
| 6,203,873 B1 * | 3/2001 | Shifman et al. ........... 428/36.8 |
| 6,277,919 B1 | 8/2001 | Dillon et al. |
| 6,310,141 B1 | 10/2001 | Chen et al. |
| 6,361,641 B1 | 3/2002 | Blong et al. |
| 6,365,250 B2 * | 4/2002 | Shifman et al. ........... 428/36.8 |
| 6,489,420 B1 | 12/2002 | Duchesne et al. |
| 6,566,452 B1 | 5/2003 | Bladel et al. |
| 6,602,565 B1 * | 8/2003 | Katayama et al. ......... 428/35.7 |
| 6,686,012 B1 | 2/2004 | Molnar et al. |
| 6,960,377 B2 * | 11/2005 | Shifman .................... 428/36.7 |
| 2002/0070473 A1 * | 6/2002 | Shifman et al. ............ 264/104 |
| 2003/0026996 A1 | 2/2003 | Duchesne et al. |
| 2003/0087053 A1 * | 5/2003 | Fukushi ................... 428/36.91 |

\* cited by examiner

FLEXIBLE HOSE HAVING REDUCED FUEL VAPOR PERMEABILITY AND METHOD OF MANUFACTURING SUCH HOSE

CROSS-REFERENCE TO RELATED APPLICATIONS

This application is a continuation-in-part of Ser. No. 10/071,634, filed Feb. 7, 2002 now abandoned, which is a divisional of Ser. No. 09/754,674, filed Jan. 4, 2001, now U.S. Pat. No. 6,365,250, which is a divisional of Ser. No. 09/083,294, filed May 22, 1998, now U.S. Pat. No. 6,203,873.

BACKGROUND OF THE INVENTION

The present invention relates generally to hoses and particularly to fuel transport hoses such as fuel filler and fuel filler neck hoses having reduced permeability to fuel vapors. More particularly, this invention relates to fuel hoses constructed from fluoropolymers.

Recent environmental regulations imposed on the automotive industry severely limit the amount of fuel vapor that can permeate from the fuel systems of motor vehicles. Choosing the right polymer to provide high performance, long service life, and reduced permeability of fuel in the fuel systems of automotive vehicles while maintaining costs at an acceptable level has been more difficult for automotive designers than ever before. A particular permeation problem associated with prior art fuel hoses involves the high permeation of fuel vapor along the surface of one of the barrier layers. Typically, fuel transfer and fuel vapor hoses include a butadiene-acrylonitrile rubber inner tubular member and a fluoroplastic barrier layer around the nitrile inner tubular layer as described in U.S. Pat. No. 5,639,528 to Feit et al.; however, such hoses have a high permeability to fuel, high fuel extraction, poor ozone resistance, poor heat aging and poor sour gas resistance. Other hoses have included a fluoroelastomer as the inner wall surface of the hose, but such hoses have a higher permeability to fuel vapors.

Other attempts to produce a fuel filler neck hose with reduced permeability to fuel vapors used a tetrafluoroethylene-hexafluoropropylene-vinylidene fluoride terpolymer liner and a thicker layer of hexafluoropropylene-vinylidene fluoride copolymer or other suitable material as the conductive inner tubular structure. See, for example, U.S. Pat. Nos. 4,606,952 to Sugimoto and 5,430,603 to Albino et al. Such hose structures have a tendency to wrinkle on the inner radius of the forming mandrel or pin causing a cosmetic defect.

Accordingly, there is a need for an improved fuel hose that meets present industry standards and is still relatively cost efficient.

SUMMARY OF THE INVENTION

It is an object of the present invention to provide a hose that is particularly useful as a fuel transport hose wherein the hose not only has improved fuel vapor barrier properties but also is reasonably economical to manufacture. In accordance with the invention, the hose comprises a plurality of layers comprising a first fluoropolymer barrier layer, a second fluoropolymer layer distinct from the first barrier layer; and a cover layer providing an outer surface of the hose. The hose of the present invention may further comprise one or more additional layers such as a synthetic elastomeric layer, and/or a reinforcing layer between the second fluoropolymer barrier layer and the cover layer.

It is another object of the present invention to provide a method for the manufacture of such hose.

In accordance with one aspect of the present invention, a fuel hose comprises a first tubular structure comprising a blend of a first fluoropolymer and a second fluoropolymer wherein the first fluoropolymer exhibits elastomeric characteristics and the second fluoropolymer exhibits thermoplastic characteristics; a second tubular structure which comprises a fluoroplastic material distinct from the first tubular structure; and a cover layer which provides an outer protective surface of the hose.

In accordance with another aspect of the invention, a method for manufacturing a fuel hose comprises: extruding a first tubular structure comprising a blend of a first fluoropolymer and a second fluoropolymer; extruding, around the first fluoropolymer, a second fluoropolymer which is distinct from the first fluoropolymer; and applying a protective cover around the second fluoropolymer.

In addition to the first fluoropolymeric barrier layer, the second fluoropolymeric layer, and the protective cover layer, the hose may also include one or more elastomeric tubular layers and/or a reinforcing layer between the second fluoropolymeric tubular structure and the protective cover layer.

The hose of the present invention not only reduces the permeation of hydrocarbon vapors through the various layers, but also prevents the flow of fuel vapor along the various layers where it can be released to the atmosphere through the ends of the hose. The present hose also has good low temperature properties, has good push-on values, exhibits extended service life, and can be produced as a smooth, uniform tubular structure without wrinkles caused by sharp turns, curves and bends during the formation of the hose on a forming mandrel or pin.

DETAILED DESCRIPTION OF THE INVENTION

Figure 1:
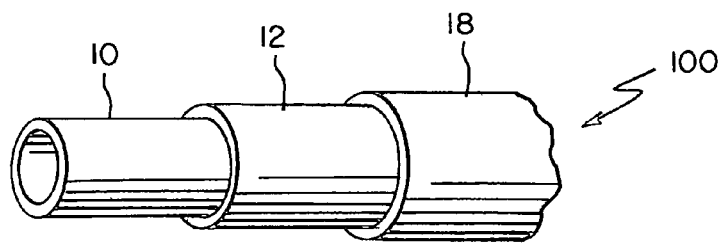
FIG. 1 is a perspective cutaway view of a tubular member that illustrates one manifestation of a first embodiment of the invention.

In accordance with one aspect of the invention, a flexible fuel hose having improved fuel vapor barrier properties comprises: a plurality of fluoropolymer layers including an inner fluoropolymeric barrier tubular structure and a second fluoropolymer tubular structure, wherein the plurality of fluoropolymer layers comprises a first barrier layer which comprises a blend of about 5 to 95 weight percent of a first fluorointerpolymer having a fluorine content of about 68 to 74%, the first fluoropolymer tubular structure comprising a copolymer or terpolymer of two or more monomers selected from the group consisting of hexafluoropropylene, vinylidene fluoride and tetrafluoroethylene, and about 95 to 5 weight percent of a second fluoropolymer having a fluorine content of about 73 to 78%, the second fluoropolymer comprising a terpolymer of hexafluoropropylene, vinylidene fluoride and tetrafluoroethylene, wherein said first fluoropolymer exhibits elastomeric characteristics and said second fluorointerpolymer exhibits thermoplastic characteristics; a second fluoropolymer layer which comprises a thermoplastic fluoropolymer of hexafluoropropylene, tetrafluoroethylene, and vinylidene fluoride monomers; and a protective cover.

In another aspect of the invention, a method for manufacturing the flexible fuel hose of the invention comprises: providing a first conductive barrier layer comprising a blend of about 5 to 95 weight percent of a first fluoropolymer having a fluorine content of about 68 to 74%, with about 95 to 5 weight percent of a second fluoropolymer having a fluorine content of about 73 to 78%, the first fluoropolymer comprising a copolymer or terpolymer formed of two or more monomers selected from the group consisting of hexafluoropropylene, vinylidene fluoride and tetrafluoroethylene, and said second fluoropolymer comprising a terpolymer of hexafluoropropylene, tetrafluoroethylene, and vinylidene fluoride monomers, wherein the first fluoropolymer exhibits elastomeric characteristics and the second fluoropolymer exhibits thermoplastic characteristics; providing a second fluoropolymer layer comprising a fluorothermoplastic terpolymer of hexafluoropropylene, tetrafluoroethylene, and vinylidene fluoride monomers; and providing an elastomeric protective cover material comprising styrene-butadiene rubber (SBR); butadiene-nitrile rubber such as butadiene-acrylonitrile rubber; chlorinated polyethylene; chlorosulfonated polyethylene; vinylethylene-acrylic rubber, acrylic rubber, epichlorohydrin rubber such as Hydrin 200, a copolymer of epichlorohydrin and ethylene oxide available from DuPont ECO; polychloroprene rubber (CR); polyvinyl chloride; ethylene-propylene copolymers (EPM); ethylene-propylene-diene terpolymer (EPDM); ultra high molecular weight polyethylene (UHMWPE); high density polyethylene (HDPE); and blends thereof, wherein the method for manufacturing the hose of the present invention further comprises the steps of: extruding a first tubular structure comprising a blend of about 5 to 95 weight percent of a first fluoropolymer having a fluorine content of about 68 to 74%, with about 95 to 5 weight percent of a second fluoropolymer having a fluorine content of about 73 to 78%, the first fluoropolymer comprising a copolymer or terpolymer formed of two or more monomers selected from the group consisting of hexafluoropropylene, vinylidene fluoride and tetrafluoroethylene, and the second fluoropolymer comprising a terpolymer of hexafluoropropylene, tetrafluoroethylene, and vinylidene fluoride, wherein the first fluoropolymer exhibits elastomeric characteristics and the second fluoropolymer exhibits thermoplastic characteristics; extruding a second tubular structure around the first tubular structure, the second tubular structure comprising a fluorothermoplastic terpolymer of hexafluoropropylene, tetrafluoroethylene, and vinylidene fluoride; and applying a protective cover around the second extruded tubular structure.

Referring to the Drawings, FIGS. 1–4 illustrate a first embodiment of a hose of the present invention wherein the first barrier layer of the hose comprises a blend of a fluoroelastomer with a fluoroplastic and the second layer is a fluorothermoplastic material. More specifically, FIG. 1 illustrates a hose 100 comprising a first barrier layer 10 forming the interior wall of the hose 100, a second layer 12 adjacent to and surrounding the first barrier layer 10, and a cover layer 18 adjacent to and surrounding the second barrier layer 12.

Figure 2:
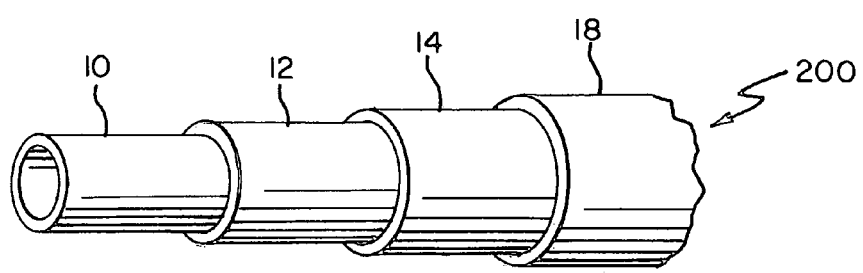
FIG. 2 is a perspective cutaway view of a tubular member that illustrates another manifestation of the first embodiment of the invention.

FIG. 2 illustrates another hose 200 comprising a first barrier layer 10 forming the interior wall of the hose 200, a second layer 12 adjacent to and surrounding the first barrier layer 10, an elastomeric layer 14 adjacent to and surrounding the second barrier layer 12, and a cover layer 18 adjacent to and surrounding the elastomeric layer 14.

Figure 3:
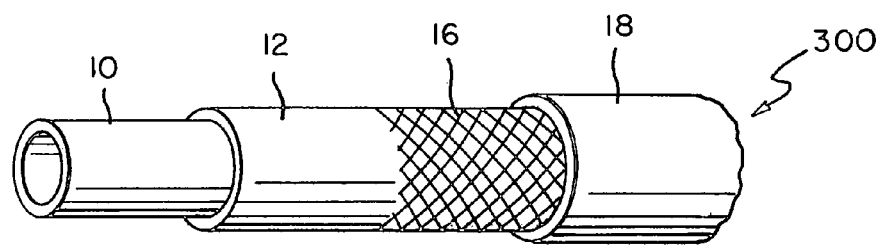
FIG. 3 is a perspective cutaway view of a tubular member that illustrates still another manifestation of the first embodiment of the invention.

FIG. 3 illustrates still another hose 300 comprising a first barrier layer 10 forming the interior wall of the hose 300, a second barrier layer 12 adjacent to and surrounding the first barrier layer 10, a reinforcement layer 16 adjacent to and surrounding the second barrier layer 12, and a cover layer 18 adjacent to and surrounding the reinforcement layer 16.

Figure 4:
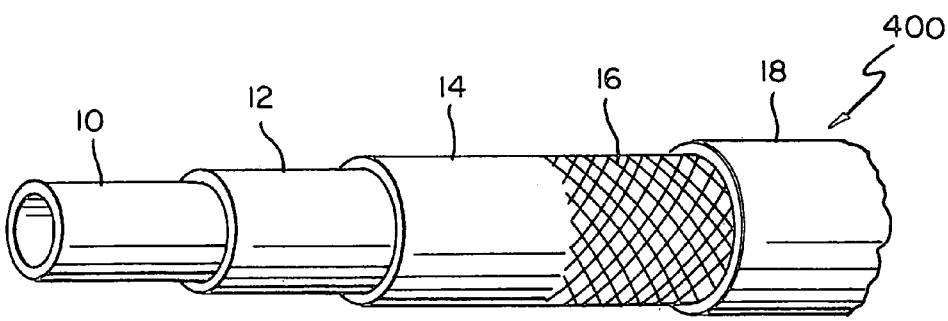
FIG. 4 is a perspective cutaway view of a tubular member which illustrates yet another manifestation of the first embodiment of the invention.

FIG. 4 illustrates yet another hose 400 comprising a first barrier layer 10 forming the interior wall of the hose 400, a second barrier layer 12 adjacent to and surrounding the first barrier layer 10, an elastomeric layer 14 adjacent to and surrounding the second barrier layer 12, a reinforcement layer 16 adjacent to and surrounding the elastomeric layer 14, and a cover layer 18 adjacent to and surrounding the reinforcement layer 16.

Figure 5:
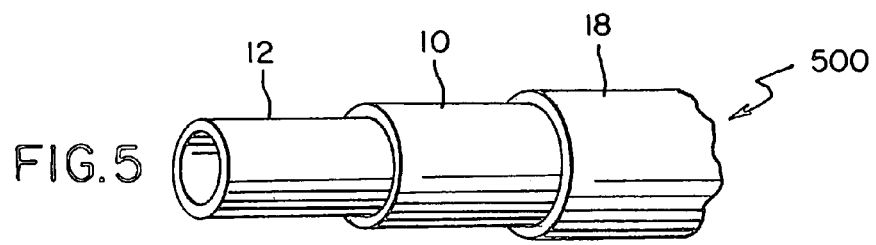
FIG. 5 is a perspective cutaway view of a tubular member that illustrates one manifestation of a second embodiment of the invention.

FIGS. 5–8 illustrate a second embodiment of a hose of the present invention wherein the first barrier comprises a fluorothermoplastic material, and the second barrier layer comprises a blend of a fluoroelastomer with a fluoroplastic. More specifically, FIG. 5 illustrates hose 500 comprising a first barrier layer 12 forming the interior wall of the hose 500, a second barrier layer 10 adjacent to and surrounding the first barrier layer 12, and a cover layer 18 adjacent to and surrounding the second layer 10.

Figure 6:
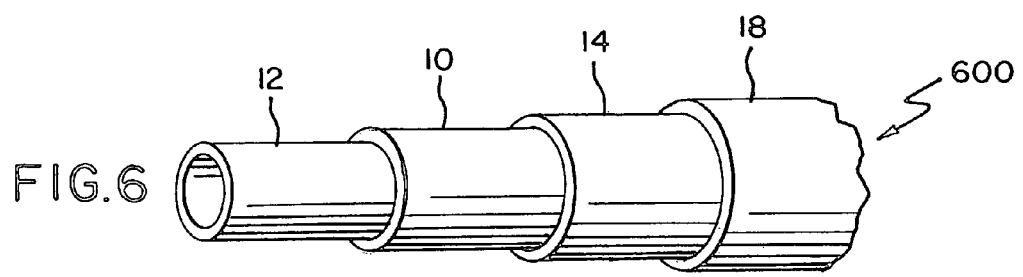
FIG. 6 is a perspective cutaway view of a tubular member that illustrates another manifestation of the second embodiment of the invention.

FIG. 6 illustrates another hose 600 comprising a first barrier layer 12 forming the interior wall of the hose 600, a second layer 10 adjacent to and surrounding the first barrier layer 12, an elastomeric layer 14 adjacent to and surrounding the second layer 10, and a cover layer 18 adjacent to and surrounding the elastomeric layer 14.

Figure 7:
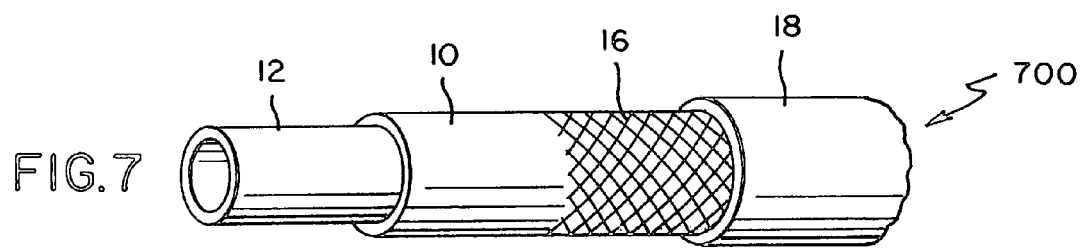
FIG. 7 is a perspective cutaway view of a tubular member which illustrates still another manifestation of the second embodiment of the invention.

FIG. 7 illustrates still another hose 700 comprising a first barrier layer 12 forming the interior wall of the hose 700, a second layer 10 adjacent to and surrounding the first barrier layer 12, a reinforcement layer 16 adjacent to and surrounding the second barrier layer 10, and a cover layer 18 adjacent to and surrounding the reinforcement layer 16.

Figure 8:
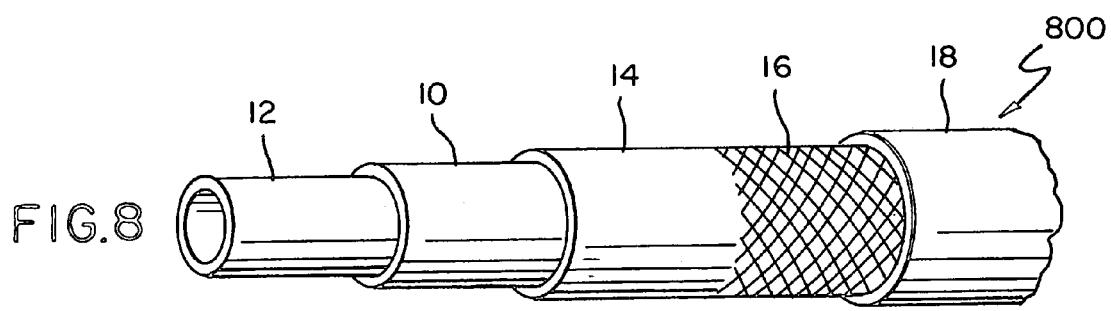
FIG. 8 is a perspective cutaway view of a tubular member which illustrates yet another manifestation of the second embodiment of the invention.

FIG. 8 illustrates yet another hose 800 comprising a first barrier layer 12 forming the interior wall of the hose 800, a second layer 10 adjacent to and surrounding the first barrier layer 12, an elastomeric layer 14 adjacent to and surrounding the second barrier layer 10, a reinforcement layer 16 adjacent to and surrounding the elastomeric layer 14, and a cover layer 18 adjacent to and surrounding the reinforcement layer 16.

The term "fluoropolymer" as used herein refers to polymers produced from two or more fluoromonomers and, is meant to encompass fluoropolymer blends, copolymers and terpolymers of fluoromonomers, and blends thereof.

The term "hydrocarbon" as used herein is meant to include fuels such as gasoline, oils, air conditioning gases, organic chemicals, and the like.

The first barrier layer 10 of the invention is a blend of two or more fluoropolymers wherein at least one of the fluoropolymers is characterized as having elastomeric characteristics and at least one of the fluoropolymers is characterized as having fluoroplastic characteristics. Preferably, the first barrier layer 10 is a blend of a fluoroelastomeric hexafluoropropylene-vinylidene fluoride copolymer or a fluoroelastomeric vinylidene fluoride-hexafluoropropylene-tetrafluoroethylene terpolymer, blended with a fluorothermoplastic tetrafluoroethylene-hexafluoropropylene-vinylidene fluoride terpolymer. Most preferably, the fluoroelastomer component on the blend has a fluorine content of about 65 to 75% and the fluoroplastic component of the blend has a fluorine content of about 73 to 78%. The hexafluoropropylene-vinylidene fluoride fluoroelastomer is commercially available from DuPont under the name Viton A, Viton E445 or Viton 60. The vinylidene fluoride-hexafluoropropylene-tetrafluoroethylene fluoroelastomer is commercially available from 3M under the name Fluorel FT2350 or FE58300QD. The tetrafluoroethylene-hexafluoropropylene-vinylidene fluoride fluoroplastic terpolymer is commercially available as Dyneon THV from Dyneon.

The blend which forms the first fluoropolymer barrier tubular structure comprises about 5 to 95 weight percent fluoroelastomer component and about 95 to 5 weight percent fluoroplastic component. Typically, the first fluoropolymer layer may contain a first fluoropolymer having about 5 to 50 weight percent fluoroelastomer component and about 95 to 50 weight percent fluorothermoplastic component and, most typically, about 5 to 70 weight percent fluoroelastomer component and about 95 to 30 weight percent fluorothermoplastic component. Since the permeability of the fuel hose to fuel vapors decreases with an increase in the fluorine content of the blend, a higher ratio of the fluoroplastic component which typically contains a higher percentage of fluorine by weight than the fluoroelastomer component may be employed in the blend 10; however, the plastic-like properties of the fluorothermoplastic components are prone to cause kinking of the hose when the fluorothermoplastic component is too high. Typically, the fluorine content of the fluoroelastomer component of the blend is about 68 to 74% and the fluorine content of the fluorothermoplastic component of the blend is about 73 to 78%. Such blends have been found to provide a good balance between reduced fuel vapor permeability and good physical properties of the hose. Typically, the thickness of the barrier layer 10 is about 5 to 25 mils, preferably about 13 to 14 mils.

The second barrier layer 12 of the present invention is a thermoplastic hexafluoropropylene-tetrafluoroethylene-vinylidene fluoride terpolymer. A fluorothermoplastic terpolymer found to be particularly useful as the second barrier layer 12 for the hose of the present invention is Dyneon THV a hexafluoropropylene-tetrafluoroethylene-vinylidene fluoride terpolymer commercially available from Dyneon.

The compositions of the present invention are either unvulcanized or vulcanized using any of the art established vulcanizing agents such as peroxides, polyols, polyamines, etc. The peroxide vulcanizing agent includes, for example, dicumyl peroxide, 2-5-dimethyl-2, 5-di(t-butylperoxy) hexyne-3, etc. The polyol vulcanizing agent includes, e.g., hexafluoroisopropylidene-bis (4-hydroxyphenyl-hydroquinone, isopropylidene-bis(4-hydroxyphenyl), and the like.

The polyamine vulcanizing agent includes, e.g., hexamethylenediamine carbamate, alicyclic diamine carbamate, etc. The amount of vulcanizing agents employed is generally that which is customarily used in the art. Typically, about 0.5 to 10% vulcanizing agent is employed depending upon the vulcanizing agent employed.

The elastomer layer 14 may be a synthetic elastomer such as an acrylonitrile-butadiene rubber, ethylene-acrylate rubber, and the like.

The outer cover 18 of the hose is a protective layer of any commercially recognized materials for such use such as elastomers, thermoplastic polymers, thermosetting polymers, and the like. Typically, the protective layer is a synthetic elastomer having good heat resistance, oil resistance, weather resistance and flame resistance. Preferably, the outer cover layer is a synthetic elastomer selected from the group consisting of styrene-butadiene rubber (SBR); butadiene-nitrile rubber such as butadiene-acrylonitrile rubber; chlorinated polyethylene; chlorosulfonated polyethylene; vinylethylene-acrylic rubber, acrylic rubber, epichlorohydrin rubber such as Hydrin 200, a copolymer of epichlorohydrin and ethylene oxide available from DuPont ECO; polychloroprene rubber (CR); polyvinyl chloride; ethylene-propylene copolymers (EPM); ethylene-propylene-diene terpolymer (EPDM); ultra high molecular weight polyethylene (UHMWPE); high density polyethylene (HDPE); and blends thereof. Preferably, the synthetic elastomer is chloroprene.

The reinforcing member 16 is a material that affords physical strength to the finished hose. Typically, the reinforcing member is a natural or synthetic fiber selected from the group consisting of glass fibers, cotton fibers, polyamide fibers, polyester fibers and rayon fibers. In some instances the reinforcing member may be metal wire. Preferably, the reinforcing material is an aromatic polyamide such as Kevlar or Nomex both of which are manufactured by DuPont. The reinforcing material may be knitted, braided or spiraled to form the reinforcing member. In a preferred aspect of the invention, the reinforcing material is spiraled around a tubular structure. While the reinforcing layer may be a preferred component of the hose structure, it is not critical and may or may not be employed in the manufacture of certain hoses depending upon the requirements of the manufacturer.

As is common practice in the industry, the innermost layer of the hose of the present invention, whether it is the first barrier layer 10 or the second barrier layer 12, is made conductive to prevent the build-up of static electricity generated by the flow of fuel along the inner surface of the hose. Typically, the first barrier layer 10 and/or the second barrier layer 12 is made conductive by compounding the layer material with carbon black or other industry recognized ingredients to provide conductivity to the barrier layer. While the amount of conductive material added is not critical, excess conductive material such as carbon black tends to make the material more difficult to process. In vapor or vent applications, the innermost layer of the hose need not be conductive.

In the first embodiment of the present invention, as shown in FIGS. 1–4, the first barrier layer 10 forms the inner tubular wall structure of the fuel transfer hose and is a conductive blend of a fluoroelastomer and a fluorothermoplastic wherein the fluorine content of the fluoroelastomer is about 68 to 74% and the fluorothermoplastic is about 73 to 78%. Preferably, the blend 10 is made conductive by incorporating carbon black into the composition, in a sufficient amount to prevent a build-up of static electricity.

In the second embodiment of the present invention, as shown in FIGS. 1–8, the second barrier layer 12 forms the inner tubular wall of the fuel transport hose and is a conductive fluorothermoplastic terpolymer formed from hexafluoropropylene, tetrafluoroethylene and vinylidene fluoride monomers.

Methods of producing fuel transfer hoses are known in the art. For example, separate extrusion, tandem extrusion or coextrusion processes may be used. For versatility and cost reasons, the preferred methods for producing the fuel filler transfer hoses of the present invention are separate extrusion and tandem extrusion.

In a preferred embodiment, the manufacture of the fuel hose of the present invention is as follows: The conductive first barrier layer comprising a blend of about 5 to 95 weight of a first fluoropolymer comprising a copolymer, terpolymer or a mixture thereof formed from two or more monomers selected from the group consisting of hexafluoropropylene, vinylidene fluoride and tetrafluoroethylene, with about 95 to 5 weight percent of a second fluoropolymer, said second fluoropolymer comprising a copolymer, terpolymer or mixture thereof formed by the copolymerization of two or more monomers selected from the group consisting of hexafluoropropylene, vinylidene fluoride and tetrafluoroethylene, is extruded into a tube and then immediately fed through another extruder during which the second barrier layer comprising a fluorothermoplastic of hexafluoropropylene-tetrafluoroethylene-vinylidene fluoride is applied. After the tube has been extruded and the appropriate layers, including any elastomeric layer, are applied, strands of reinforcing fibers such as Kevlar are applied, preferably by spiraling, to the tubular structure. A protective cover such as chloropolyethylene is then applied onto the reinforced tube, preferably, by a cross-head extruder. The chloropolyethylene is drawn down onto the reinforced tubular structure by use of a vacuum. The covered reinforced tube is then placed on a mandrel and vulcanized. The formed hose is then manually removed from the mandrel.

Other polymers, e.g., fluorinated ethylene-propylene (FEP) copolymers such as Teflon, which is available from DuPont, may be used as a component in the preparation of the blend of the first barrier layer.

Other additives such as antioxidants, processing aids, etc. can be employed in carrying out the present invention and it is within the scope of this invention to incorporate herein any such additives as commonly used in making fuel line hoses.

The blended fluoroelastomer/fluorothermoplastic barrier layer of the present invention is useful in reducing the permeability of fuel vapor from the fuel transfer hose; however, it is also useful in reducing the permeability of chemical vapor such as those used in air conditioning hoses, oil hoses, and the like where severe chemical resistance or vapor permeation resistance is required.

The use of the first barrier layer and the second barrier layer, in accordance with the present invention, to manufacture fuel transfer hose, unexpectedly achieves almost complete impermeability of fuel vapors from the hose.

While the use of a first barrier layer comprising a fluoroelastomer/fluorothermoplastic blend and a second barrier layer comprising a hexafluoropropylene-tetrafluoroethylene-vinylidene fluoride terpolymer are particularly useful in hose construction to reduce permeability of fuel vapor, the combination of such first barrier layer comprising a fluoroelastomer/fluorothermoplastic blend and a second fluoropolymer layer comprising a hexafluoropropylene-tetrafluoroethylene-vinylidene fluoride terpolymer can be used in the manufacture of other articles where reduced fuel or hydrocarbon vapor is desired, such as in the manufacture of O-rings, gaskets diaphragms, etc.

EXAMPLE

In order to demonstrate the advantages of a fuel hose of the present invention, several hoses (A) prepared in accordance with the present invention were provided. Each of the hoses had an inner layer consisting of a blend containing about 95 weight percent of a first fluoroelastomer having a fluorine content of about 68 to 74%, and about 5 weight percent of a second fluorothermoplastic having a fluorine content of about 73 to 78%. A similar number of other hoses (B) representative of prior art hoses had a nitrile (NBR) inner layer and a tetrafluoroethylene-hexafluoropropylene-vinylidene fluoride terpolymer (THV) layer surrounding the inner NBR layer. All of the hoses were subject to identical treatments that included fuel extraction, ozone resistance, tensile, elongation, and heat aging. The results are shown in TABLE 1.

TABLE 1

| Sample | A | B |
|---|---|---|
| Fuel extraction, grams/square meter[1] | 1.3–1.9 | 42.5–77 |
| Ozone Resistance[2] | No Cracks and Tears | Many Cracks and Tears |
| Tensile | −14% | −53% |
| Elongation | −4% | −53% |
| Heat Aging[3] | Bent with no signs of cracks | Very brittle and cracked when bent |

[1]Measured by filling the hose with fuel and holding for 24 hours; pouring off the fuel; evaporating the fuel and measuring the extracted material.
[2]Subjecting inner layer of hose to one hundred parts per hundred million of ozone.
[3]Aging slabs of inner tube of hose for 7 days @ 150° C. running bend tests Having illustrated and described the present invention in detail and by reference to preferred embodiments thereof, it will be apparent that modifications and variations are possible without departing from the scope of the invention defined in the appended claims.

What is claimed is:

1. A flexible fuel hose having improved fuel vapor barrier properties, said hose comprising a plurality of tubular structures, comprising:
   a first tubular structure comprising a fluoropolymer barrier layer formed from a blend of about 5 to 95 weight percent of a first fluoropolymer having a fluorine content of about 68 to 75%, said first fluoropolymer comprising a copolymer or terpolymer formed of two or more monomers selected from the group consisting of hexafluoropropylene, vinylidene fluoride and tetrafluoroethylene, and about 95 to 5 weight percent of a second fluoropolymer having a fluorine content of about 73 to 78%, said second fluoropolymer comprising a terpolymer of hexafluoropropylene, vinylidene fluoride and tetrafluoroethylene, wherein said first fluoropolymer exhibits elastomeric characteristics and said second fluoropolymer exhibits thermoplastic characteristics;

a second tubular structure formed around said first inner tubular structure, said second tubular structure comprising a fluorothermoplastic terpolymer of hexafluoropropylene, tetrafluoroethylene, and vinylidene fluoride; and a protective cover, wherein one of said first tubular structure and said second tubular structure forms an inner barrier layer and the other of said first tubular structure and said second tubular structure forms a second layer around said inner barrier layer.

2. The hose of claim 1 wherein said first tubular structure forms said barrier layer and said second tubular structure forms said second layer around said inner barrier layer.

3. The hose of claim 1 further comprising a reinforcing layer between said second barrier layer and said protective cover layer.

4. The hose of claim 3 wherein said reinforcing layer is a layer of fibers selected from the group consisting of polyamide fibers, polyester fibers, rayon fibers, glass fibers and cotton fibers.

5. The hose of claim 4 wherein said fibers are polyamide fibers.

6. The hose of claim 1 further comprising an elastomer layer between said second tubular structure and said reinforcing layer.

7. The hose of claim 6 wherein said elastomer layer is selected from the group consisting of nitrile-butadiene rubber, epichlorohydrin rubber, and ethylene-acrylate rubber.

8. The hose of claim 7 wherein said elastomer layer is butadiene-acrylonitrile rubber.

9. The hose of claim 1 wherein said protective cover is a layer of synthetic elastomer selected from the group consisting of styrene-butadiene rubber, nitrile-butadiene rubber, chloroprene rubber, chlorinated polyethylene, chlorosulfonated polyethylene, epichlorohydrin-ethylene oxide copolymer, polyvinyl chloride, and blends thereof.

10. The hose of claim 9 wherein said protective cover is chlorinated polyethylene.

11. The hose of claim 1 wherein said inner barrier layer further comprises a conductive material.

12. The hose of claim 11 wherein said conductive material is carbon black.

13. A flexible hose having improved fuel vapor barrier properties, said fuel hose comprising:

a first inner tubular structure forming an inner barrier layer comprising a fluoropolymer barrier layer formed from a blend of about 5 to 95 weight percent of a first fluoropolymer having a fluorine content of about 68 to 74%, said first fluoropolymer comprising a copolymer or terpolymer formed of two or more monomers selected from the group consisting of hexafluoropropylene, vinylidene fluoride and tetrafluoroethylene, and about 95 to 5 weight percent of a second fluoropolymer having a fluorine content of about 73 to 78%, said second fluoropolymer comprising a terpolymer of hexafluoropropylene, vinylidene fluoride and tetrafluoroethylene, wherein said first fluoropolymer exhibits elastomeric characteristics and said second fluoropolymer exhibits thermoplastic characteristics;

a second tubular structure formed around said first inner tubular structure, said second tubular structure comprising a fluorothermoplastic terpolymer formed of hexafluoropropylene, tetrafluoroethylene, and vinylidene fluoride;

a reinforcing member which comprises natural or synthetic fibers selected from the group consisting of glass fibers, cotton fibers, polyamide fibers, polyester fibers, and rayon fibers; and a protective cover which comprises a synthetic elastomer selected from the group consisting of styrene-butadiene rubber (SBR); butadiene-nitrile rubber such as butadiene-acrylonitrile rubber; chlorinated polyethylene; chlorosulfonated polyethylene; vinylethylene-acrylic rubber; acrylic rubber; epichlorohydrin rubber such as Hydrin 200; a copolymer of epichlorohydrin and ethylene oxide available from DuPont ECO; polychloroprene rubber (CR); polyvinyl chloride; ethylene-propylene copolymers (EPDM); ethylene-propylene-diene terpolymer (EPDM); ultra high molecular weight polyethylene (UHMWPE); high density polyethylene (HDPE); and blends thereof.

14. The hose of claim 13 wherein said first fluoropolymer is a hexafluoropolypropylene-vinylidene fluoride copolymer.

15. The hose of claim 14 wherein said fibers are polyamide fibers.

16. The hose of claim 13 wherein said synthetic elastomer is chloropolyethylene.

17. The hose of claim 13 further comprising an elastomeric material between said second tubular structure and said reinforcing member.

18. A method for the manufacture of a flexible fuel hose comprising the steps of:

extruding a first tubular structure comprising a blend of about 5 to 95 weight of a first fluoropolymer having a fluorine content of about 68 to 74%, with about 95 to 5 weight percent of a second fluoropolymer having a fluorine content of about 73 to 78%, said first fluoropolymer comprising a copolymer or terpolymer formed of two or more monomers selected from the group consisting of hexafluoropropylene, vinylidene fluoride and tetrafluoroethylene, and said second fluoropolymer comprising a terpolymer of hexafluoropropylene, tetrafluoroethylene, and vinylidene fluoride, wherein said first fluoropolymer exhibits elastomeric characteristics and said second fluoropolymer exhibits thermoplastic characteristics;

extruding a second tubular structure around said first tubular structure, said second tubular structure comprising a fluorothermoplastic terpolymer of hexafluoropropylene, tetrafluoroethylene, and vinylidene fluoride; and applying a protective cover around said second extruded tubular structure.

19. The method of claim 18 further comprising the step of applying a reinforcing layer on said layer of elastomer material prior to applying said protective cover.

20. The method of claim 19 wherein said reinforcing layer is a layer of fibers selected from the group consisting of polyamide fibers, polyester fibers, rayon fibers, glass fibers, and cotton fibers.

21. The method of claim 20 wherein said reinforcing layer is a layer of polyamide fibers.

22. The method of claim 21 wherein said reinforcing fibers are applied on said second extruded tubular structure by spiraling.

23. The method of claim 18 further comprising the step of applying a layer of elastomer material selected from the group consisting of nitrile-butadiene rubber, epichlorohydrin rubber, and ethylene-acrylate rubber on said second extruded tubular structure prior to applying said reinforcing fibers.

24. The method of claim 23 wherein said elastomeric material is butadiene-acrylonitrile rubber.

25. The method of claim 18 wherein said protective cover is a synthetic elastomer selected from the group consisting of styrene-butadiene rubber, nitrile-butadiene rubber, chloroprene rubber, chlorinated polyethylene, chlorosulfonated polyethylene, epichlorohydrin-ethylene oxide copolymer, polyvinyl chloride, and blends thereof.

26. The method of claim 25 wherein said synthetic elastomer is chlorinated polyethylene.

27. The method of claim 18 wherein said protective cover is applied by cross head extruder.

* * * * *